United States Patent
Kennedy, Jr. et al.

(10) Patent No.: US 7,949,340 B2
(45) Date of Patent: *May 24, 2011

(54) METHOD AND SYSTEM FOR APPLYING WIRELESS GEOLOCATION TECHNOLOGY

(75) Inventors: Joseph P. Kennedy, Jr., Great Falls, VA (US); Thomas Booker Gravely, Herndon, VA (US); John Peter Carlson, Herndon, VA (US); Andrew Beck, Ashburn, VA (US)

(73) Assignee: Andrew, LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/683,311

(22) Filed: Jan. 6, 2010

(65) Prior Publication Data

US 2010/0120413 A1   May 13, 2010

Related U.S. Application Data

(63) Continuation of application No. 11/076,903, filed on Mar. 11, 2005, now Pat. No. 7,668,552, which is a continuation of application No. 10/046,284, filed on Jan. 16, 2002, now Pat. No. 6,920,329.

(60) Provisional application No. 60/261,264, filed on Jan. 16, 2001.

(51) Int. Cl.
*H04W 40/00* (2009.01)
(52) U.S. Cl. .................. 455/446; 455/456.1; 455/456.5; 342/463
(58) Field of Classification Search ............... 455/404.1, 455/404.2, 422, 440, 442, 443, 444, 446, 455/456.1–457, 524–526, 561; 342/357.01, 342/357.02, 357.06–357.09, 386, 450, 457, 463–465; 701/200, 207, 213, 214, 215
See application file for complete search history.

(56) References Cited

U.S. PATENT DOCUMENTS

| | | | |
|---|---|---|---|
| 4,728,959 A | 3/1988 | Maloney et al. |
| 4,845,504 A | 7/1989 | Roberts et al. |
| 4,891,650 A | 1/1990 | Sheffer |
| 5,056,106 A | 10/1991 | Wang et al. |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,404,376 A | 4/1995 | Dent |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,592,180 A | 1/1997 | Yokev et al. |
| 5,668,562 A | 9/1997 | Cutrer et al. |
| 5,675,344 A | 10/1997 | Tong et al. |
| 5,736,964 A | 4/1998 | Ghosh et al. |
| 5,914,687 A | 6/1999 | Rose |
| 5,945,948 A | 8/1999 | Buford et al. |
| 5,959,580 A | 9/1999 | Maloney et al. |
| 5,960,341 A | 9/1999 | LeBlanc et al. |
| 5,970,413 A | 10/1999 | Gilhousen |
| 5,973,643 A | 10/1999 | Hawkes et al. |
| 6,047,192 A | 4/2000 | Maloney et al. |
| 6,097,336 A | 8/2000 | Stilp |
| 6,108,555 A | 8/2000 | Maloney et al. |
| 6,119,013 A | 9/2000 | Maloney et al. |

(Continued)

*Primary Examiner* — Anthony S Addy

(74) *Attorney, Agent, or Firm* — Duane Morris, LLP

(57) ABSTRACT

A system and method for determining the positioning of mobile-appliance location determining sensors in a mobile-appliance communications network by estimating the positioning accuracy of the sensors.

3 Claims, 4 Drawing Sheets

U.S. PATENT DOCUMENTS

| | | | |
|---|---|---|---|
| 6,127,975 A | 10/2000 | Maloney | |
| 6,173,186 B1 | 1/2001 | Dalley | |
| 6,184,829 B1 | 2/2001 | Stilp | |
| 6,201,499 B1 | 3/2001 | Hawkes et al. | |
| 6,281,834 B1 | 8/2001 | Stilp | |
| 6,288,675 B1 | 9/2001 | Maloney | |
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,366,241 B2 | 4/2002 | Pack et al. | |
| 6,400,320 B1 | 6/2002 | Stilp et al. | |
| 6,407,703 B1 | 6/2002 | Minter et al. | |
| 6,463,290 B1 | 10/2002 | Stilp et al. | |
| 6,636,743 B1 | 10/2003 | Vicharelli et al. | |
| 6,646,604 B2 | 11/2003 | Anderson | |
| 6,674,403 B2 | 1/2004 | Gray et al. | |
| 6,711,148 B1 | 3/2004 | Hills | |
| 6,771,969 B1 | 8/2004 | Chinoy et al. | |
| 6,847,896 B1 | 1/2005 | Orban et al. | |
| 6,985,839 B1 | 1/2006 | Motamedi et al. | |
| 2003/0157939 A1 | 8/2003 | Wang et al. | |

METHOD AND SYSTEM FOR APPLYING WIRELESS GEOLOCATION TECHNOLOGY

RELATED APPLICATIONS

This application is a continuation of and claims benefit of U.S. nonprovisional application Ser. No. 11/076,903, titled "METHOD AND SYSTEM FOR APPLYING WIRELESS GEOLOCATION TECHNOLOGY" filed Mar. 11, 2005 now U.S. Pat. No. 7,668,552, which is a continuation of and claims benefit of U.S. nonprovisional application Ser. No. 10/046,284, titled "METHOD AND SYSTEM FOR APPLYING WIRELESS GEOLOCATION TECHNOLOGY" filed Jan. 16, 2002 now U.S. Pat. No. 6,920,329, which claims the benefit of U.S. Provisional Patent Application No. 60/261,264, filed Jan. 16, 2001.

The present application is related to the following co-pending and commonly assigned U.S. Patent Applications having inventors in common with the present application: application Ser. No. 09/971,680 entitled "System and Method for Geolocating a Wireless Mobile Unit from a Single Base Station Using Repeatable Ambiguous Measurements", filed Oct. 9, 2001; application Ser. No. 10/011,783 entitled "System and Method for Analog Cellular Radio Geolocation" filed Dec. 11, 2001; and application Ser. No. 10/004,449 entitled "Pseudolite Positioning System and Method" filed Dec. 6, 2001 claiming priority of U.S. Provisional Patent Application Ser. No. 60/254,134 entitled "Pseudolite Positioning System and Method" filed Dec. 11, 2000. The disclosures of the above-referenced applications are hereby incorporated herein by reference.

BACKGROUND OF THE INVENTION

Applicant's disclosure is directed to the selection and positioning of mobile-appliance location determining sensors in a wireless communication network. The disclosure assists in the pre-installation design of a mobile-appliance location determining system which utilizes a network infrastructure overlay location approach (as opposed to techniques where the location is determined with modifications to the mobile-appliance) where equipment is installed within the wireless network base stations and/or switching centers to determine the mobile-appliance location.

The use of wireless communication devices such as telephones, pagers, personal digital assistants, laptop computers, etc., hereinafter referred to collectively as "mobile-appliances", has become prevalent in today's society. Recently, at the urging of public safety groups, the government has begun to require that the providers of mobile-appliance communication services geolocate, or determine the geographic position, of the mobile-appliance in certain circumstances. For example, the Federal Communication Commission (FCC) has issued a geolocation mandate for providers of cellular telephone communication services in order to geolocate a cellular telephone used to make a 911 emergency telephone call. An accuracy standard (FCC 94-102 E911) has been established by the FCC, which the geolocation systems must meet. Accordingly, the providers of cellular telephone services are interested in location determining systems which meet the accuracy standard at the minimum cost.

In addition to E911 emergency related issues, cellular telecommunications providers are developing location-enabled services for their subscribers including roadside assistance, turn-by turn driving directions, concierge services, location-specific billing rates and location-specific advertising.

There are two major approaches to determining the location of a mobile-appliance. One approach is appliance based and requires modification to the conventional mobile-appliance so that the mobile-appliance is capable of determining its own location, e.g., through the use of GPS or some other location system. The other approach is network based and requires modifications to the communication network so that location sensors can determine the location of the mobile appliance based on the communication signals transmitted between the mobile-appliance and the network. Applicant's disclosure is directed to the selection and placement of mobile-appliance location determining sensors through the network in order to locate a mobile-appliance.

There are presently a number of techniques available to locate mobile appliances. These include time difference of arrival (TDOA), angle of arrival (AOA), radio fingerprinting, reverse link power measurements, and collateral data matching (i.e., map or other features useful in estimating location). Each of these techniques has associated with it a theoretical and practical location accuracy, and an associated cost to implement. The techniques vary widely in their performance as a function of the radio frequency (RF) propagation environment, base station geometry and wireless air interface. For each of the techniques, there exists many implementation variants and permutations. For example, TDOA can be implemented using two or four RF channels to measure time of arrival, and can include spatial filtering techniques to enhance performance in certain RF environments. Each of these location capabilities has associated with it a different cost, with cost generally increasing for increased accuracy performance.

A conventional technique for deploying location determining sensors has been to co-locate the sensors with each of the base stations in a communication network in order to process the communication signals received at the base station. The location determining accuracy provided by such a deployment is then checked by randomly traveling to various geographic locations within the coverage area of the communication area with an independent location determining equipment, i.e., GPS, and comparing the independent location determination from GPS with the location determined from the location determining sensors at the base stations. If the location accuracy of the system is not sufficient, additional location determining sensors can be added apart from the base stations, or the sensors can be replaced with more capable sensors to improve the accuracy of the system. This method of installing and measuring the accuracy of the sensors is labor intensive and expensive.

Other employment techniques have positioned the location determining sensors at selected base stations and added additional sensors on an ad hoc basis as the accuracy verification using GPS or other independent means identified areas having substandard location determining accuracies.

Thus, the overall cost and performance of the location determining system is largely driven by the number of location determining sensors installed, as well as the types of sensors installed. It is for this reason that a detailed planning system and method is critical to design a location determining system for performance and cost effectiveness.

Accordingly, it is an object of the present disclosure to provide a novel system and method for determining the position of location determining sensors in a communication system.

It is another object of the present disclosure to provide a novel system and method for selecting location determining sensors having various capabilities in order to meet a predetermined accuracy standard at the least cost.

It is a further object of the present disclosure to provide a novel system and method of positioning location determining sensors based on estimated accuracies without the necessity of actually measuring communication signals.

It is yet another object of the present disclosure to provide a novel system and method of location determining sensors having various capabilities to address the varied signal propagation and site geometries in the communication coverage area.

It is still another object of the present disclosure to provide a novel system and method for modeling the transmit power of a mobile-appliance.

It is yet still another object of the present disclosure to provide a novel system and method of estimating the TDOA, AOA or collateral data matching error for a location determining system.

It is still another object of the present disclosure to provide a novel system and method of presenting the accuracy results of a location determining system as accuracy contour lines overlaid on a geographic map.

These and many other objects and advantages of the present invention will be readily apparent to one skilled in the art to which the disclosure pertains from a perusal of the claims, the appended drawings, and the following detailed description of the preferred embodiments.

DESCRIPTION OF THE PREFERRED EMBODIMENTS

Figure 1:
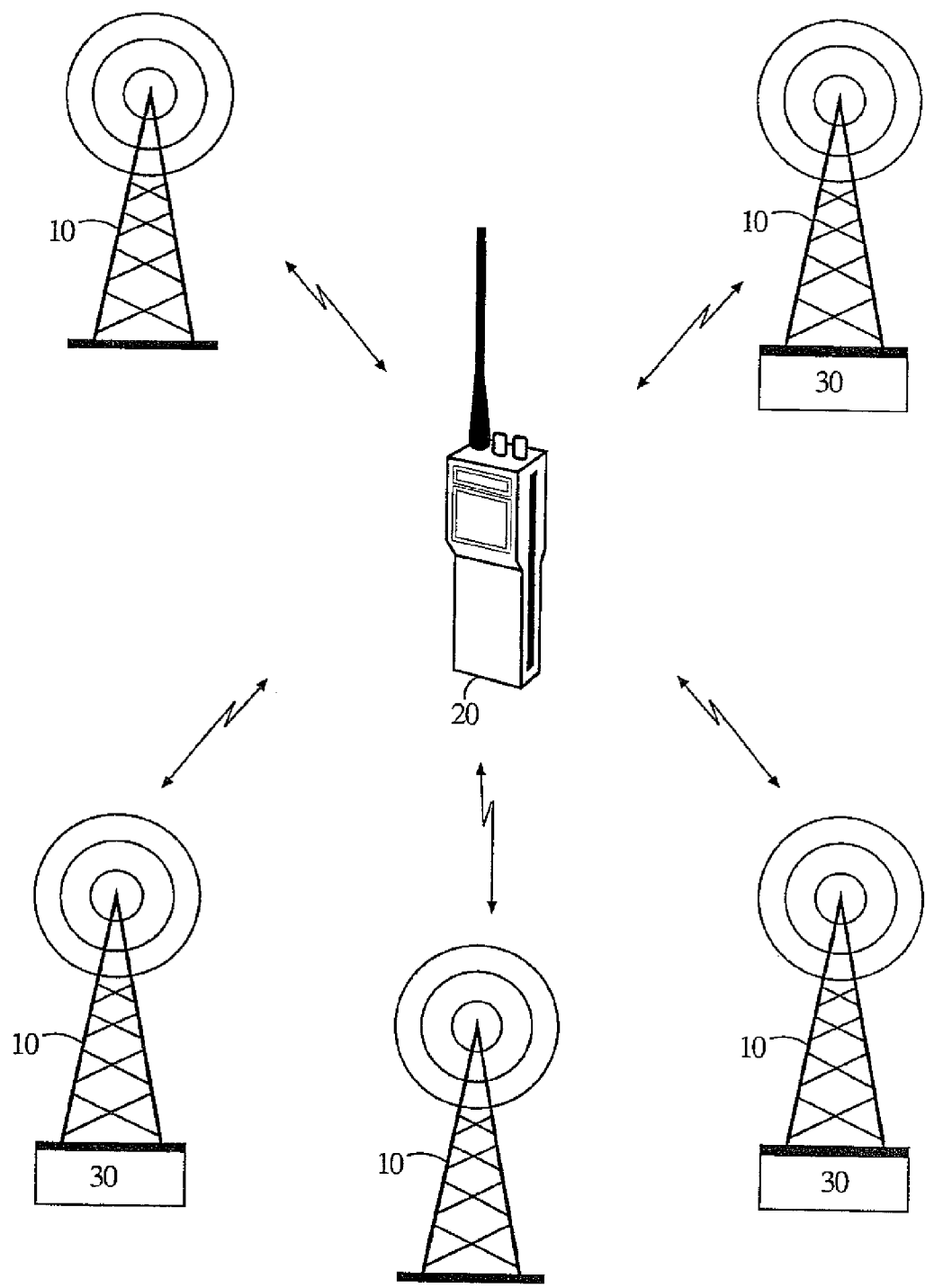
FIG. 1 is a pictorial representation of a conventional mobile-appliance communication system.

FIG. 1 shows a conventional mobile-appliance communication system having base stations 10 for communicating with a mobile-appliance 20. Each base station 10 contains signal processing equipment and an antenna for transmitting to and receiving signals from the mobile appliance as well as other base stations and centrally located control and processing stations (not shown). A mobile-appliance location determining sensor 30 may be positioned at some or all of the base stations 10 to determine the location of a mobile-appliance within the signal coverage area of the communication system. The antenna may be a multi-element antenna. The signal reception area of a base station may be divided into sectors of various orientations depending on the type of antenna configuration and signal processing equipment. The mobile-appliance communication system is designed so that the mobile-appliance preferably has the capability to communicate with at least one base station while in the coverage area.

The transmit power level of the mobile-appliance may be controlled by a power management architecture to ensure that the mobile-appliance transmits at a sufficient power level to be received by at least one base station, but not high enough to be received at other base stations. Such a power management architecture allows more than one mobile-appliance in the coverage area to use the same frequency simultaneously while avoiding cross interference.

The capability of the base stations to receive signals from the mobile-appliance is based on a number of factors such as the geographic location of the base station with respect to the location of the mobile-appliance, the height of the antenna, the number of sectors, the orientation of the sectors, the power management architecture and the antenna characteristics.

The propagation of the communication signals in the coverage area is affected by such factors as the topography and morphology. Propagation loss models are well known and can be used to estimate the propagation in the coverage area using a propagation loss model for similar topography and morphology. For example, the Lee-New York City, and the Hata-Large City models empirically characterize path loss for different terrain configurations. The Lee model is more popular in the wireless industry, while the Rata model is considered more stringent and is generally considered as a "worst case" scenario.

Propagation loss models are typically used during the design of mobile-appliance communication networks to determine the pre-installation location of the base stations necessary to provide communication coverage in a given area.

Figure 2:
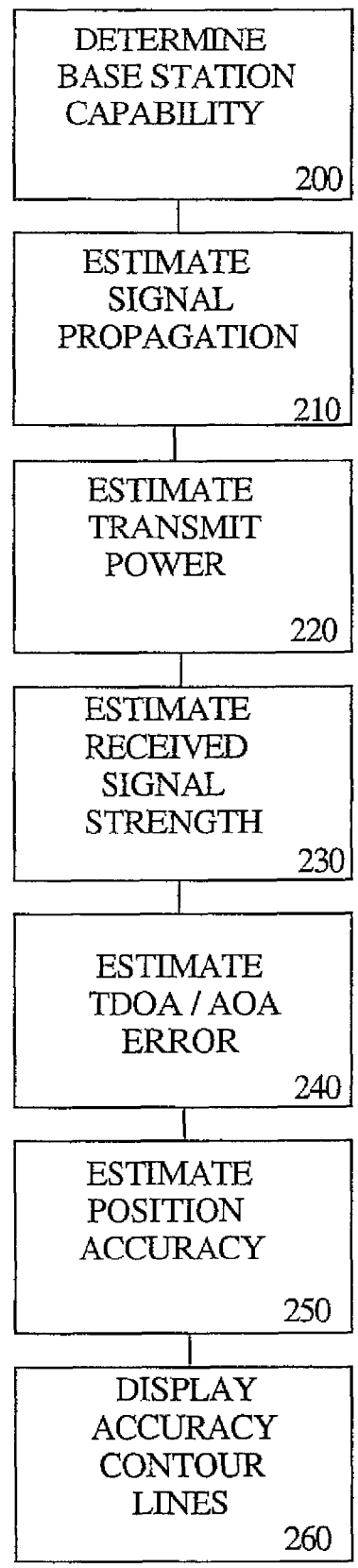
FIG. 2 is a flow chart of a method of determining the position of mobile-appliance location determining sensors in the conventional mobile-appliance communication system of FIG. 1.

FIG. 2 is a block diagram of the steps of one of the preferred embodiments of the present disclosure. The determination of the position of mobile-appliance location determining sensors begins with a determination of the base station capabilities 200 including the geographic location of the base station, the height of the base station, the number of sectors, the orientation of the sectors, the power management and antenna characteristics. Information about the environment of the coverage area such as topology and morphology is collected and an appropriate propagation loss model is selected based on the environment. Using the appropriate propagation loss model, the signal propagation characteristics for the signal paths between the possible locations of the mobile-appliance and the surrounding base stations can be estimated 210.

Based on the wireless air interface being used by the mobile appliance and the associated transmit power management architecture and the distance between the mobile-appliance and the assumed serving base station, estimates of the transmit power of the mobile-appliance are made for various locations in the coverage area where the mobile appliance may reside 220. In one embodiment, this is accomplished by defining a set of points that span the coverage area in grid like fashion having separations between spanning points on the order of 100-500 meters.

Mobile-appliance transmit power affects position accuracy. Location system accuracy improves with the inclusion of data from additional base stations. The ability of additional base stations that may be several cells away from the mobile-appliance to receive the signal is dependent on the power level of the mobile appliance. Mobile-appliances that are located close to its controlling base station are powered down, limiting the number of distant base stations that can participate in the positioning. Applicant's disclosure takes into account the effects of transmit power control architecture.

The received signal strength is estimated 230 for each of the base stations in the vicinity of the mobile-appliance for each of the spanning points in the coverage area based on the estimated propagation characteristics, the estimated mobile transmit power and the base station capabilities. The base stations which are estimated to receive a signal of sufficient strength are identified and p:3fticipate in determining a location determining accuracy.

For the base stations that have a sufficient received signal strength, TDOA, AOA and collateral data generated errors are estimated 240 for each of the spanning points. The process of estimating the TDOA, AOA, and collateral data generated errors takes into account the effects of the topology, morphology and base station capability that are specific to the processing capability of the location determining sensors. In one embodiment, three different capabilities are available:

(a) two-channel TDOA sensor;
 (b) four-channel TDOA sensor; and
 (c) four-channel TDOA in combination with AOA sensor.

The channel counts refer to the number of RF channel antenna feeds that are simultaneously received by the units that make time/angle of arrival measurements. The higher the number of channels, the more accurate the sensor, which comes with a higher cost as well. The processing and algorithms used to estimate errors and position accuracy during the planning of a geolocation system are similar to the processing and algorithms actually used by the geolocation systems to determine the location of the mobile appliance.

Collateral data generated errors can be estimated based on the availability of collateral data for a given spanning point. For example, collateral data may include a series of highway segments located in the signal coverage area. The highway segments can be used to increase the accuracy of the location determination of a mobile-appliance located on the highway. Spanning points located in close proximity to the highway would have smaller estimated collateral data generated errors than spanning points located further from the highway. Thus, a collateral data generated error can be estimated based on the availability of collateral data in the coverage area.

A location determining accuracy can be estimated for each of the spanning points based on the estimated TDOA/AOA errors 250. Thus for each type of sensor capability the location accuracy is estimated. These accuracy estimations for each of the spanning points can be displayed on a geographic plot as accuracy contour lines 260. The selection of the type of sensor and the positioning of that sensor can then be determined using the estimated accuracy results.

Figure 4:
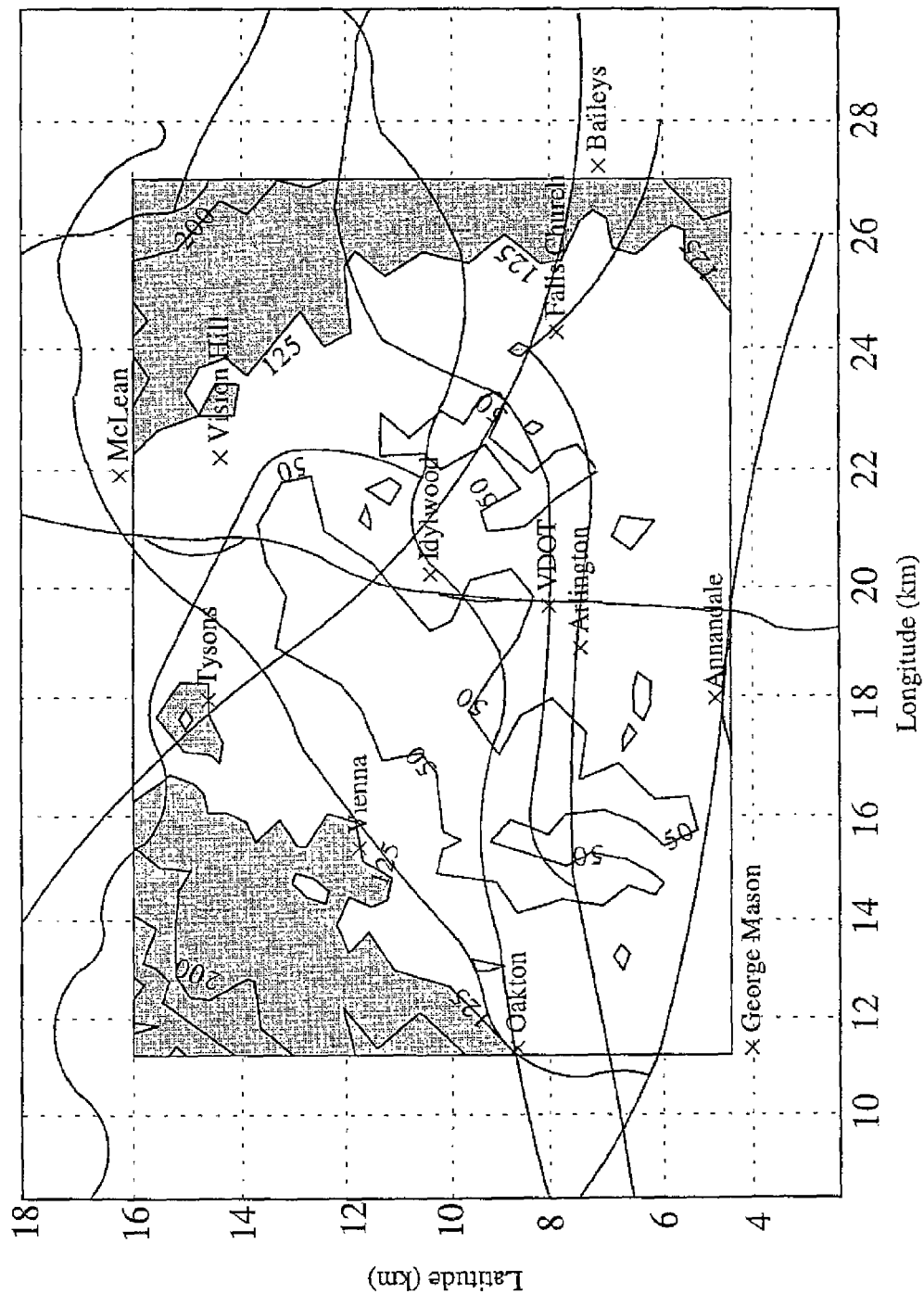
FIG. 4 is a geographical plot of the accuracy estimations as contour lines for a location system utilizing the method of FIG. 2.

In one embodiment, the location accuracy is estimated using the lowest cost sensor (two channel TDOA) for the entire coverage area. The accuracy results can then be displayed as a contour line where the accuracy is greater than some predetermined threshold. For example, FIG. 4 illustrates the estimated accuracy plotted as accuracy contours on a geographic plot of a coverage area where two-channel TDOA sensors are used. The shaded area defined by the contour line marked "125" represents where the estimated location determination error will exceed 125 meters 67% of the time. The contour line marked "50" represents an area in which the location determination error will be less than 50 meters 67% of the time.

Based on the accuracies achieved with different sensor capabilities, the type of sensor with the lowest cost that meets the market accuracy requirement is selected for that base station site. Additionally, in areas where the predetermined accuracy is met by the lowest cost variant (two-channel TDOA) with margin, some of the location determining sensors may be completely eliminated from selected base station sites as long as minimum accuracy compliance is maintained.

Figure 3:
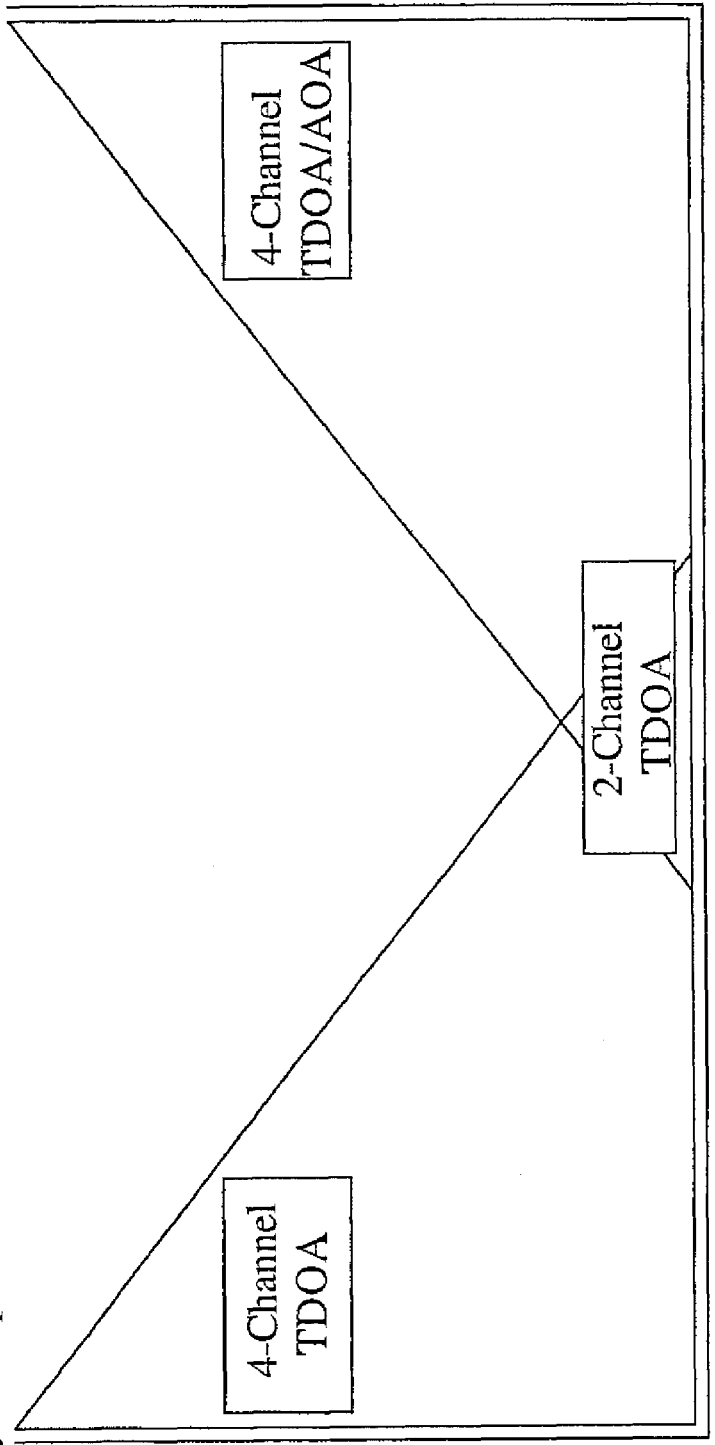
FIG. 3 is a graphical illustration of the location determining capabilities of the present disclosure which overcome the environmental challenges in a typical communication coverage area.

In one embodiment of applicant's disclosure, three types of sensor capabilities can address three broad target market environment conditions that are common to RF propagation and base station layout or geometry. With reference to FIG. 3, a continuum of RF environments is illustrated beginning with rural environments, progressing through suburban environments, and ending with urban environments. Beginning with RF environments and cell site layouts found in suburban areas, generally there are relatively good line of site paths from the mobile-appliance to the base stations. There typically are a large number of base stations that can receive the mobile appliance transmission and thus make measurements on the RF signal and participate in the location determination. Thus, the suburban environment can be addressed with two-channel TDOA sensors.

In rural environments, base station sites tend to be sparsely deployed. Thus the site location geometry is relatively poor, and the number of sites that can receive a mobile transmission appliance is typically low. In these instances, AOA capability needs to be available. This increased capability allows a mobile-appliance to be located with only two sensors.

In urban environments, there is a high likelihood that the line of sight signal path is blocked to many base station sites. Using RF measurements heavily weighted by multi-path propagation induces high position error. In these cases, four-channel TDOA sensors are used so that spatial filtering can be done on the RF signal to isolate the direct and multi-path paths to mitigate the effects of the multi-path on the position estimates.

Thus, the basic two-channel IDOA unit can be augmented with additional capability to address more challenging environments either with respect to propagation (loss of line of sight/high multi-path), or poor base station geometry. Because the increased capability comes at the price of higher equipment costs and higher installation costs, the ability to create accurate position error estimates enables an optimization of the deployment of the location determining sensors to provide the desired accuracy at the least cost.

In another embodiment of applicant's disclosure, it may be desirable to minimize the number of sensors deployed in a geolocation system. For example, in some geographic areas the installation of the geolocation equipment may be limited or restricted due to practical considerations such as political issues, ownership issues, environmental issues, etc. Thus a system having fewer sensors may be more quickly or efficiently deployed than a system having more sensors. The present disclosure may be used, in this instance, to select the use of a four channel TDOA with AOA sensor to eliminate the need for three two-channel IDOA sensors, while still meeting the prescribed positioning accuracy requirements.

In another embodiment of applicant's disclosure, it may be desirable to limit the deployment of the sensors to a specific capability and at a location other than a base station. For example, an AOA sensor requires an antenna capable of providing signals for determining the angle of arrival of the received signal. However, it may not desirable to add an AOA capable antenna to the geolocation system due to client preferences, practical considerations, environmental constraints, etc. The present disclosure may be used, in this instance, to select the use of two two-channel TDOA sensors at non-base station locations instead of an AOA sensor at a base station, while still meeting the prescribed positioning accuracy requirements.

Additionally, the prescribed positioning accuracy requirements for specific applications may vary. For example, the positioning accuracy for providing turn-by-turn driving directions may be greater than the accuracy required for providing concierge services. The present disclosure can be used to achieve a particular level of accuracy or minimum accuracy for specific applications.

Further, the present disclosure can be used to "upgrade" the geolocation systems as sensors having increased capabilities are developed and introduced into the system, or as prescribed position accuracy requirements are changed.

Thus, applicant's disclosure provides a location determining system accuracy assessment to aid in the design, and pre-installation site assessment and performance analysis for a mobile-appliance location determining system. Note that the accuracy determination and assessment are accomplished entirely through simulation without the necessity of measuring the actual communication signals, resulting in an efficient, less costly and less labor intensive method of planning a location determining system.

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What is claimed is:

1. In a mobile-appliance communication system with plural base stations, a method of positioning location sensors for determining the location of a mobile-appliance within a predetermined accuracy, the improvement comprising the steps of:

positioning the location determining sensors at some but not all of the plural base stations to minimize the number of location determining sensors, the positioning being a function of an estimated accuracy of the location calculated by the location determining sensors; and positioning the location determining sensors at some but not all of the plural base stations to minimize the number of location determining sensors, the positioning being a function of the costs of the location determination sensors.

2. The method of claim 1, wherein the location determining sensors are positioned as a function of minimizing the number of sensors required for a signal coverage area.

3. The method of claim 1, wherein the location determining sensors are positioned as a function of a selected capability of the sensor.

\* \* \* \* \*